(12) United States Patent
Tanaka

(10) Patent No.: US 6,654,799 B1
(45) Date of Patent: Nov. 25, 2003

(54) NETWORK MANAGEMENT SYSTEM USES MANAGED OBJECT INSTANCES WHICH ARE HIERARCHICALLY ORGANIZED IN INCLUSION RELATION FOR RECURSIVELY CREATING PROCESSING OBJECT AND RECURESIVELY RETURNING INFORMATION

(75) Inventor: Katsuyuki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/318,747

(22) Filed: May 26, 1999

(30) Foreign Application Priority Data

May 27, 1998 (JP) ............................................ 10-145436

(51) Int. Cl.[7] ............................................ G06F 15/173
(52) U.S. Cl. ........................ 709/223; 709/202; 709/224
(58) Field of Search ................................. 709/223, 224, 709/200, 202; 345/440; 713/1

(56) References Cited

U.S. PATENT DOCUMENTS 6,067,093 A * 5/2000 Grau et al. ................. 345/440
6,272,521 B1 * 8/2001 Jablonski et al. ........... 709/200
6,292,889 B1 * 9/2001 Fitzgerald et al. .............. 713/1

FOREIGN PATENT DOCUMENTS

| EP | 0 843 441 A2 | 5/1998 |
|----|--------------|--------|
| JP | 4-1999933 A | 7/1992 |
| JP | 5-191407 | 7/1993 |
| JP | 8-328840 A | 12/1996 |
| JP | 9-245005 A | 9/1997 |
| JP | 10-124423 A | 5/1998 |
| JP | 11-252209 A | 9/1999 |

* cited by examiner

*Primary Examiner*—Le Hien Luu
(74) *Attorney, Agent, or Firm*—Sughrue Mion, PLLC

(57) ABSTRACT

A network management method which can provide a reduced number of communication transactions is disclosed. A processing object is recursively created for accessing a child managed object included in a parent manage object based on the tree structure. The information obtained by a child processing object is recursively returned to a parent processing object based on the tree structure. A collection of information received by the top managed-object instance is returned to the network manager. A network element device is added as a managed object to the network by the collection of information is stored in a managed-object instance corresponding to the network element device.

6 Claims, 10 Drawing Sheets

NETWORK MANAGEMENT SYSTEM USES MANAGED OBJECT INSTANCES WHICH ARE HIERARCHICALLY ORGANIZED IN INCLUSION RELATION FOR RECURSIVELY CREATING PROCESSING OBJECT AND RECURESIVELY RETURNING INFORMATION

BACKGROUND OF THE INVENTION

1. Field of the Invention

The present invention generally relates to a network management system, and in particular to a network management system and method for obtaining and setting the configuration information of a plurality of managed objects that are network elements.

2. Description of the Related Art

In general, a network management system preferably employs a hierarchical management strategy to efficiently manage a network composed of a number of network elements including modems, terminals, transmission devices, switches and the like. Actually, the network elements are managed by using virtual managed-object data instances, which are hierarchically organized into a tree structure for network management. Using such a tree structure, the network operator can easily identify each managed object to perform desired access processing such as setting of necessary information and collection of management information.

A management information storage device which is designed to reduce the number of retrieval operations has been disclosed in Japanese Patent Unexamined Publication No. 5-191407. The number of retrieval operations for each managed object is counted. If the number of retrieval operations for a managed object exceeds a predetermined value, then the identification name of that managed object is registered. When a management application requests the retrieval operation of the registered managed object, the registered information of that managed object is sent directly to a management interface without the intervention of the management application. This causes the number of retrieval operations for the managed object that has been accessed at frequent intervals to be lowered, resulting in the reduced burden on the management application.

In the case where a managed object includes a plurality of child objects of its own, however, it is necessary for an operator terminal to get access to each of the child objects included in the targeted managed object based on the tree structure, resulting in the increased amount of communications between the operator terminal and a management system.

Further, in the case where a new network element is added to the network, the conventional management system cannot handle such a change dynamically because the management operator must create a managed-object instance for that added network element using the tree information.

SUMMARY OF THE INVENTION

An object of the present invention is to provide a network management method and system which enables obtaining access to a managed object including a plurality of child objects to obtain and set the configuration information thereof with the reduced number of communication steps.

According to an aspect of the present invention, a method for managing a network composed of a plurality of managed objects using managed-object instances which are hierarchically organized in inclusion relation, includes the steps of: a) receiving an access request to a designated managed-object instance from a manger, the designated managed-object instance corresponding to a certain managed object in the network; b) recursively creating a processing object for accessing a managed object included in the designated manage object based on the inclusion relation; c) recursively returning information obtained by a lower-level processing object to a higher-level processing object based on the inclusion relation; and d) returning a collection of information received by the designated managed-object instance to the manager.

A processing object is recursively created to collect necessary information by distributed data processing and the collected information is sent back to the network manager. Therefore, the number of communication transactions between the network manager and the network management system is dramatically reduced, resulting in the improved performance of the network.

According to another aspect of the present invention, a method includes the steps of: a) detecting addition of a network element device to the network; b) creating a managed-object instance corresponding to the network element device; c) creating a processing object corresponding to the network element device, wherein the processing object recursively creates a child processing object for accessing a component included in the network element device; d) recursively returning information obtained by a lower-level processing object to a higher-level processing object based on the inclusion relation; e) storing a collection of information received by the processing object onto the managed-object instance to add the network element device as a managed object to the network; and f) reporting the addition of the network element device to a network manager.

When a new network element device is connected to the network, a processing object for the network element device obtains the configuration information of the components of the network element device to automatically create a managed-object instance therefor. Therefore, an easy management operation can be achieved.

DETAILED DESCRIPTION OF THE PREFERRED EMBODIMENTS

First Embodiment

Figure 1:
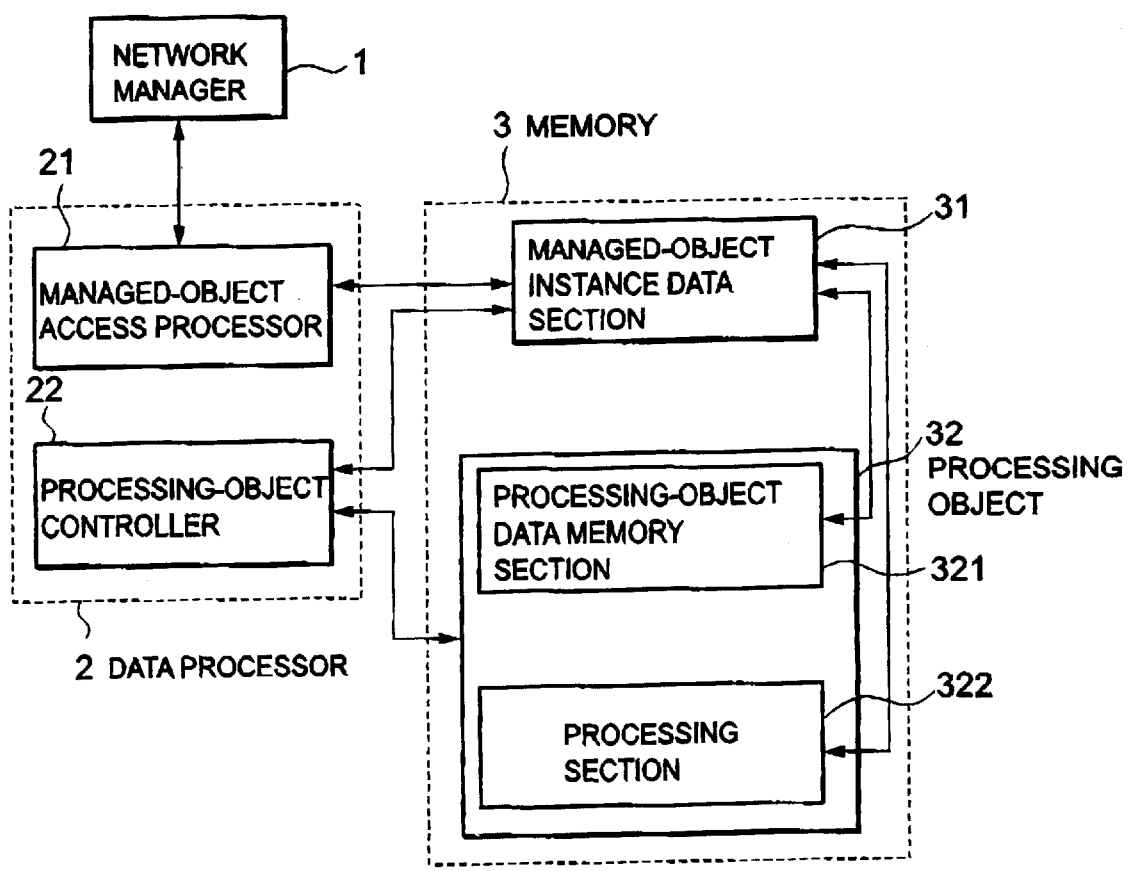
FIG. 1 is a block diagram showing a network management system according to a first embodiment of the present invention.

Referring to FIG. 1, for simplicity, a network management system according to a first embodiment of the present invention is schematically composed of a network manager 1, a data processor 2 and a memory 3. The network manager 1 sends a request for management operation to the data processor 2 and receives desired management information from it. The data processor 2 performs the requested management operation using the memory 3.

The data processor 2 includes a managed-object access processor 21 and a processing-object controller 22. The memory 3 includes a managed-object instance data section 31 and, as necessary, one or more processing object 32 which will be created by the processing-object controller 22. The managed-object instance data section 31 stores the physical configuration information of the network elements to be managed, including packages and communication ports, and further the logical information such as serial registration numbers thereof.

A processing object 32 gets access to the managed-object instance section 31 to obtain and write data from and to the managed-object instance section 31. The processing object 32 includes a processing-object data memory section 321 and a processing section 322. The processing-object data memory section 321 stores the attribute data of its own and the result data obtained by executing the processing of its own. The processing section 322 stores the processing contents of the processing object 32 to be executed. The details of the processing object 32 will be described later referring to FIG. 2.

The managed-object access processor 21 receives a request for the configuration information of a designated network element from the network manager 1 and obtains access to the managed-object instant corresponding to the designated network element in the managed-object instance data section 31 of the memory 3. The designated managed-object instance performs the processing of obtaining the configuration information of its own. Thereafter, if the designated managed-object instance includes at least one child instance, it sends a request for creation of a processing-object corresponding to the child instance to the processing-object controller 22. Upon reception of the request from the managed-object instance, the processing-object controller 22 creates the processing object 32 corresponding to each child instance in the memory 3. The processing objects created in the memory 3 independently perform the processing of obtaining the management information. It should be noted that, if a processing object 32 needs to obtain the information of its child managed-object instance, a processing object 32 is recursively created for each child managed-object instance in the memory 3, which will be described later.

When a processing object 32 has obtained the necessary information, the processing object 32 sends the obtained information back to its parent processing-object or the designated managed-object instance and, thereafter, is deleted from the memory 3.

In this way, it is possible to obtain the management information of a designated managed-object instance and all the child instances thereof by recursively getting access to all of them while creating a processing object 32.

Figure 2:
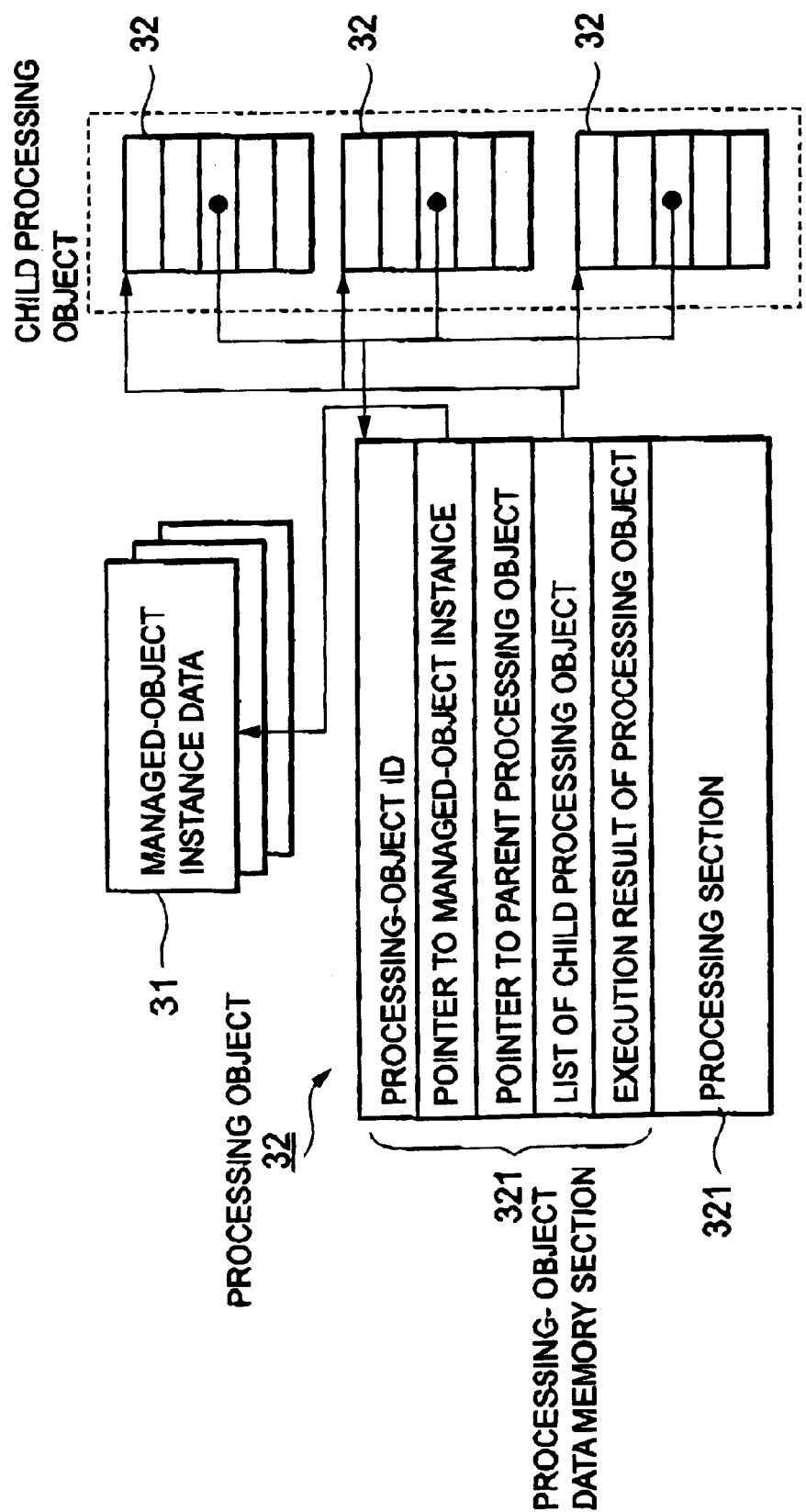
FIG. 2 is a schematic diagram showing an example of the format of a processing object.

As shown in FIG. 2, at a request of the designated managed-object instance, the processing-object controller 22 creates a processing object 32. The processing object 32 is composed of the following elements:

Processing-object ID which is used to identify the processing-object of interest;

Pointer to the designated managed-object instance;

Pointer to the parent processing object of the processing object of interest in the case of recursive processing;

List of child processing objects (here, three objects) created based on the inclusion relation of the network elements to be managed; and Execution result of the processing object of interest.

In FIG. 2, the managed-object access processor 21 receives a request including the kind of processing, the identification (ID) of a designated processing-object instance, parameters indicating information to be obtained or set. If the designated managed-object instance includes three child instances as shown in FIG. 2, it sends a request for creation of a processing object 32 corresponding to the child instance to the processing-object controller 22. Upon reception of the request from the managed-object instance, the processing-object controller 22 creates three processing objects 32 corresponding to the child instances in the memory 3. Each of the three child processing objects 32 has the same format as the parent processing object 32.

Figure 3:
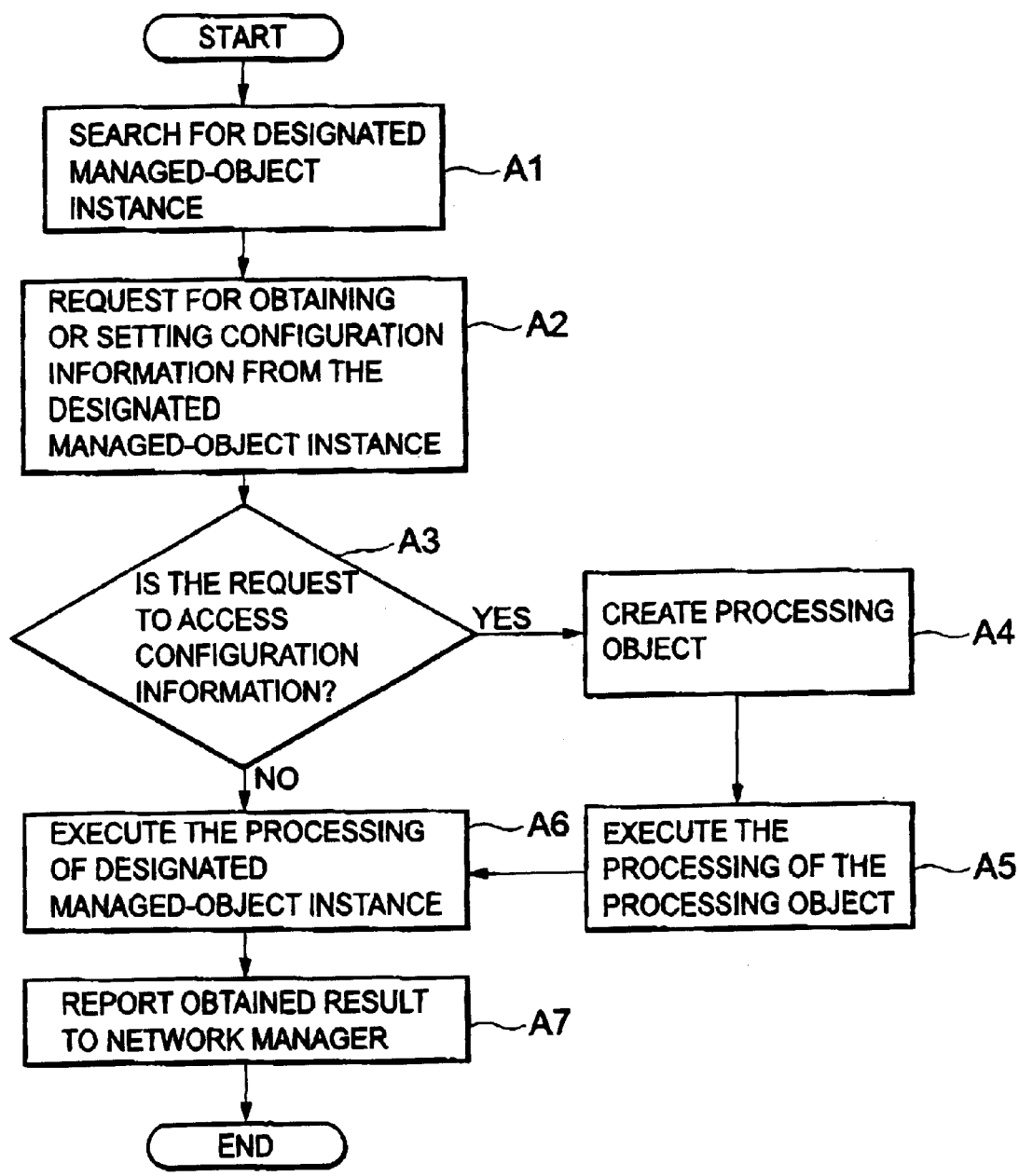
FIG. 3 is a flowchart showing an operation of the first embodiment.

Referring to FIG. 3, when receiving a request for obtaining/setting configuration information of a managed-object instance from the network manager 1, the managed-object access processor 21 searches the managed-object instance data section 31 for the designated managed-object instance based on the tree structure (step A1). After the designated managed-object instance is found, the managed-object access processor 21 sends an execution request for the designated managed-object instance to perform the processing of obtaining or setting the configuration information thereof (step A2).

When receiving the execution request from the managed-object access processor 21, the designated managed-object instance determines whether the execution request can be filled in itself or needs to access a child managed-object instance thereof (step A3).

If the execution request needs to access a child managed-object instance (YES in step A3), the designated managed-object instance sends a processing-object creation request to the processing-object controller 22, which creates a processing object 32 in the memory 3 (step A4). As described before, when a plurality of child managed-object instances are included, plural processing objects corresponding to the child managed-object instances are created, respectively.

Then, the created processing object 32 gets access to the corresponding child managed-object instance to obtain the configuration information thereof. The obtained configuration information is sent back to the designated managed-object instance which has requested for the creation of the processing object 32 itself (step A5).

When the execution request can be filled in itself (NO in step A3) or when the step A5 has been completed, the designated managed-object instance obtains the configuration information of its own and sends the result information including the child managed-object back to the managed-object access processor 21 (step A6). Finally, the managed-object access processor 21 reports the obtained result to the network manager 1 (step A7).

Figure 4:
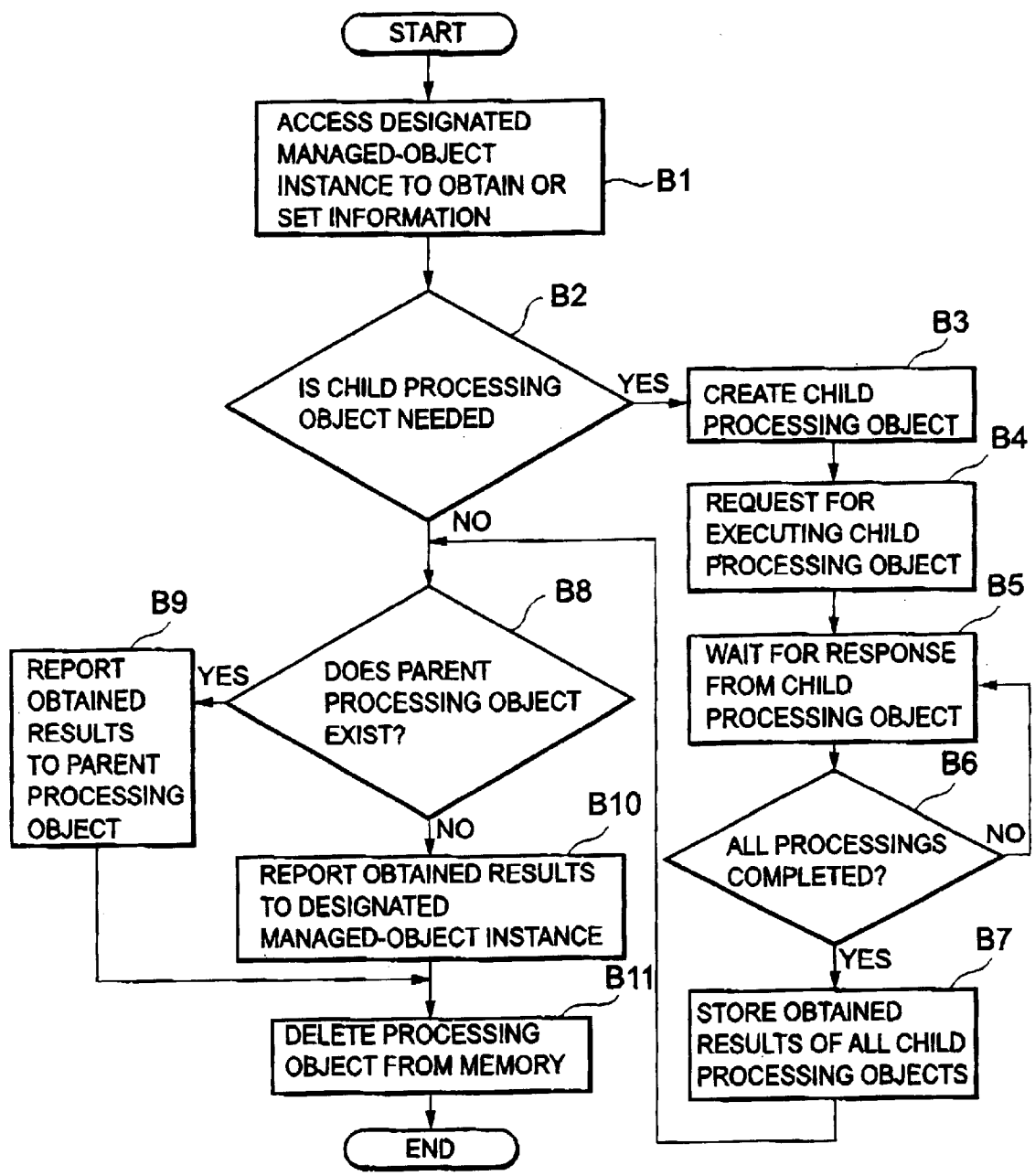
FIG. 4 is a flowchart showing an operation of a processing object in the first embodiment.

Referring to FIG. 4, the processing object 32 created in the step A4 gets access to the designated managed-object instance to obtain or set the configuration information of the child managed-object instance of interest and then stores the execution result onto the processing-object data memory section 321 (step B1).

Subsequently, it is determined whether it is necessary to use a child processing object to get access to the configuration information of a child managed-object instance (step B2). If it is necessary to get access to the child managed-object instance (YES in step B2), then the processing object 32 requires creation of one or more child processing object of the processing-object controller 22, which creates a requested child processing object in the memory 3 (step B3). Then the processing object 32 requires access processing of the child processing object to obtain or set the configuration information thereof (step B4) and waits for the execution results to be received from all the child processing objects (steps B5 and B6).

When the execution results have been received from all the child processing objects (YES in step B6), the obtained results are stored onto the processing-object data memory section 321 (step B7).

When it is not necessary to get access to the child managed-object instance (NO in step B2) or when the step B7 has been completed, it is determined whether a parent processing object exists by checking the pointer to parent processing object stored in the processing-object data memory section 321 (step B8). If a parent processing object exists (YES in step B8), the obtained results are transferred from the processing-object data memory section 321 to the parent processing object (step B9). If no parent processing object exists (NO in step B8), the obtained results are transferred from the processing-object data memory section 321 to the designated managed-object instance (step B10). Finally, after the step B9 or the step B10 has been completed, the processing object 32 is deleted from the memory 3 (step 311).

An example of a network management procedure according to the first embodiment will be described hereafter.

Figure 5:
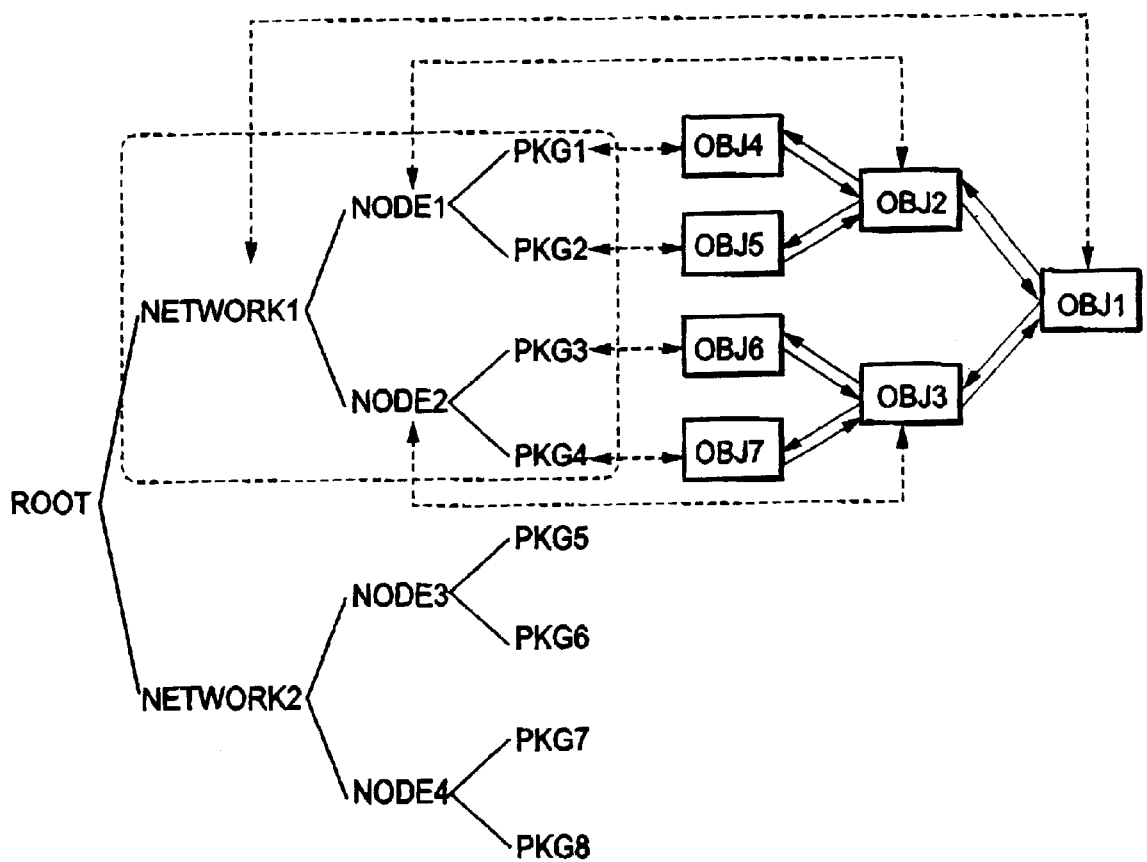
FIG. 5 is a diagram showing an example of a tree structure of the network for explanation of the operation of the first embodiment.

Referring to FIG. 5, consider a tree structure including a network1 (managed object) composed of a node1 which is further composed of packages pkg1 and pkg2 and a node2 which is further composed of packages pkg3 and pkg4. Assuming that the managed-object access processor 21 receives a request for obtaining the configuration information of all elements included in the network1 from the network manager 1.

The managed-object access processor 21 searches the managed-object instance data section 31 for the designated managed-object instance (here, the network1) based on the tree structure (step A1) and then sends a request for obtaining the configuration information of the network1 to the network1 (step A2).

Since the request is to obtain the configuration information of the network1, the network1 requests the creation of a processing object obj1 from the processing-object controller 22 (steps A3 and A4). Subsequently, the network1 requests the configuration information of all child managed-object instances included therein from the processing object obj1 (step A5).

When receiving the configuration information obtaining request from the network1, the processing object obj1 obtains the configuration information of the network1 and stores the obtained information onto the processing-object data memory section 321 (step B1).

Since the network1 includes the managed-object instances corresponding to the node1 and node2, the processing object obj1 requests creation of processing objects obj2 and obj3 from the processing-object controller 22 (step B3). The processing object obj1 sends a request for obtaining the configuration information to the processing objects obj2 and obj3 and then waits for their responses (steps B4 and B5).

Similarly, the respective processing objects obj2 an obj3 obtains the configuration information of the node1 and node2 and stores the obtained information. Further, the processing object obj2 requests creation of processing objects obj4 and obj5 from the processing-object controller 22 to obtain the configuration information thereof and the processing object obj3 requests creation of processing objects obj6 and obj7 from the processing-object controller 22 to obtain the configuration information thereof. As shown in FIG. 5, the processing object obj4 obtains the configuration information of the pkg1 and the processing object obj5 obtains the configuration information of the pkg2. It is the same with other processing objects obj6 and obj7.

Since the pkg1 to pkg4 corresponding to the processing objects obj4 to obj7 are located at the bottom of the tree structure, the processing objects obj4 and obj5 report the obtained configuration information to the parent processing object obj2 and the processing objects obj6 and obj7 report the obtained configuration information to the parent processing object obj3 (step B9). After the obj4 to obj7 have transferred the obtained configuration information to the obj2 and obj3, the obj4 to obj7 are deleted from the memory 3 by the processing-object controller 22 (step B11).

When the obj2 has stored all the configuration information of the obj4 and obj5, the obtained configuration information stored in the processing-object data memory section 321 is sent back to the parent processing object obj1 (steps B8 and B9). After the obj2 has transferred the obtained configuration information to the obj1, the obj2 is deleted from the memory 3 by the processing-object controller 22 (step B11). Similarly, When the obj3 has stored all the configuration information of the obj6 and obj7, the obtained configuration information stored in the processing-object data memory section 321 is sent back to the parent processing object obj1 (steps B5 and B9). After the obj3 has transferred the obtained configuration information to the obj1, the obj3 is deleted from the memory 3 by the processing-object controller 22 (step B11).

Finally, the obj1 reports the configuration information obtained from all the child processing objects to the designated managed-object instance (network1) (step B10). Then, the obj1 is deleted from the memory 3 by the processing-object controller 22 (step B11).

The managed-object access processor 21 processes the configuration information of the network1 and reports it to the network manager 1 (step A7).

Second Embodiment

Figure 6:
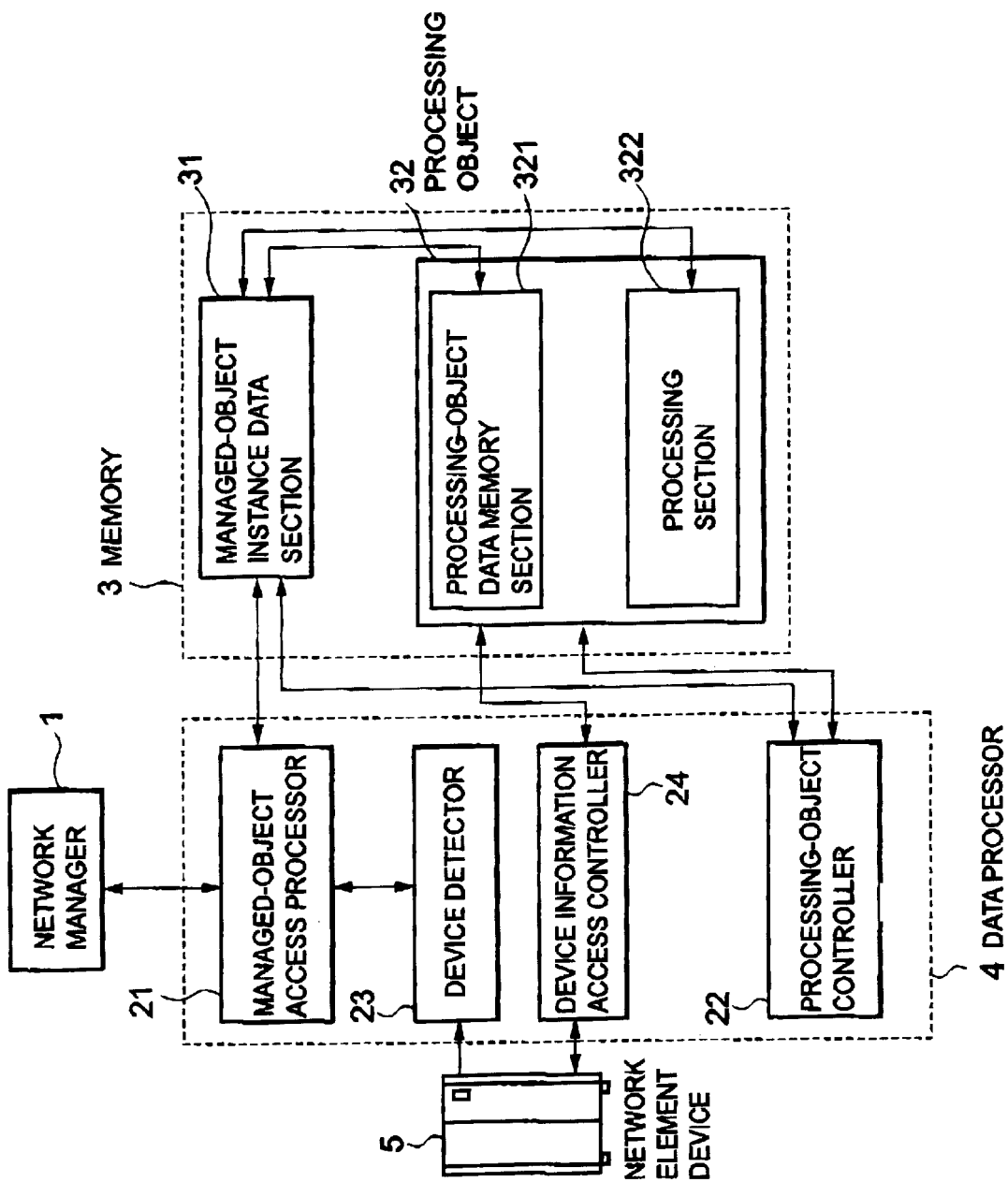
FIG. 6 is a block diagram showing a network management system according to a second embodiment of the present invention.

Referring to FIG. 6, a network management system according to a second embodiment of the present invention is schematically composed of the network manager 1, a data processor 4 and the memory 3, wherein circuit blocks similar to those previously described with reference to FIG. 1 are denoted by the same reference numerals and the details thereof are omitted.

The data processor 4 is composed of a device detector 23 and a device-information access controller 24 in addition to the managed-object access processor 21 and the processing-object controller 22. Assuming that a network element device 5 is newly added to the network, the device detector 23 detects the network element device 5 and informs the managed-object access processor 21 of the addition of the network element device 5 to create a managed-object instance corresponding to the network element device 5. At a request of the processing object 32, the device-information access controller 24 performs the processing of obtaining the configuration information from the network element device 5 and then sends the obtained configuration information of the network element device 5 back to the processing object 32 that has requested it.

Figure 7:
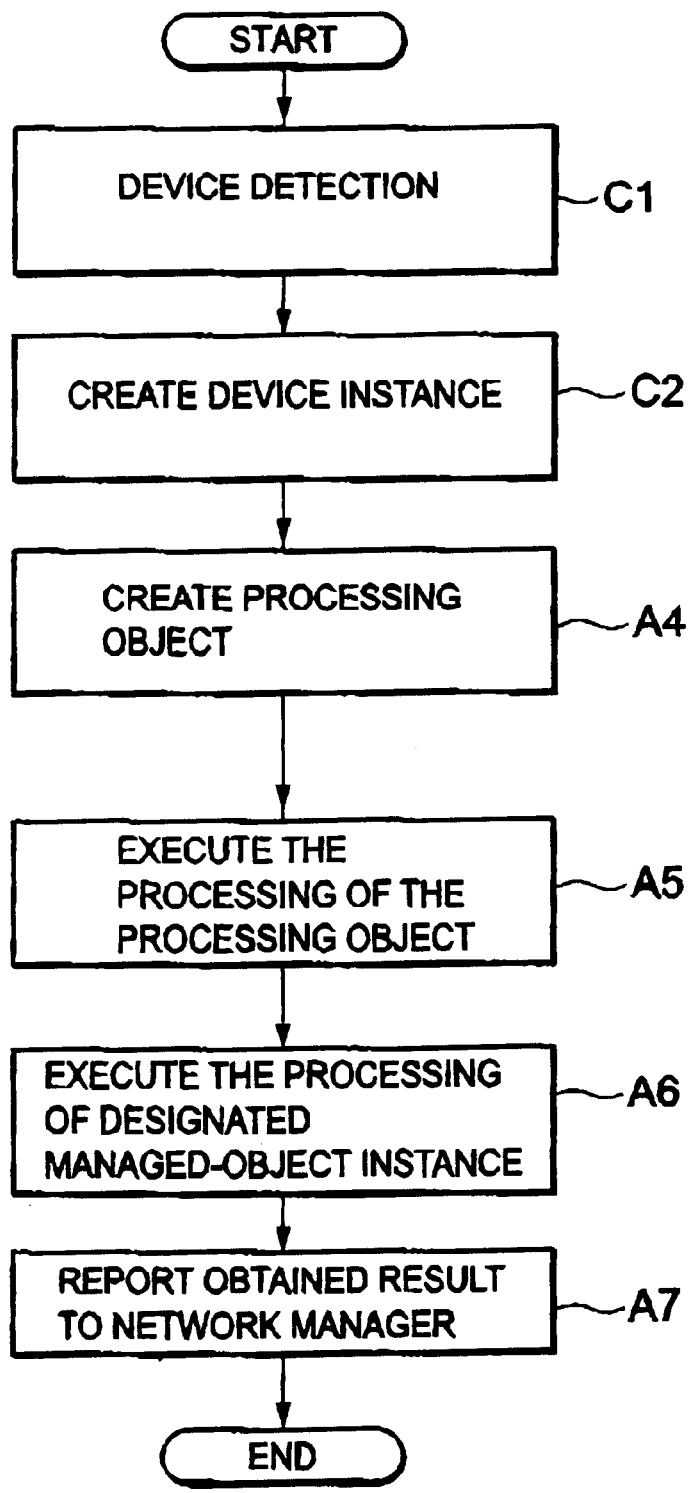
FIG. 7 is a flowchart showing an operation of the second embodiment.

Referring to FIG. 7, when the network element device 5 is newly added to the network, the device detector 23 detects the network element device 5 and informs the managed-object access processor 21 of the addition of the network element device 5 (step C1).

When knowing the addition of the network element device 5, the managed-object access processor 21 creates a managed-object instance corresponding to the network element device 5 in the memory 3 (step C2). In this case, the components such as communication and power supply packages provided in the network element device 5 should be managed. The managed-object access processor 21 sends a request for creating a processing object 32 corresponding to the network element device 5 (step A4).

Thereafter, the processing object 32 sends a request for obtaining the configuration information of the network element device 5 to the device information access controller 24. At a request of the processing object 32, the device-information access controller 24 performs the processing of obtaining the configuration information from the network element device 5 and then sends the obtained configuration information of the network element device 5 back to the processing object 32 that has requested it (step A5). The details of the step A5 in the second embodiment will be described later.

When the step A5 has been completed, the designated managed-object instance stores the result information received from the processing object 32 (step A6). Finally, the managed-object access processor 21 reports the addition of the network element device 5 to the network manager 1 (step A7).

Figure 8:
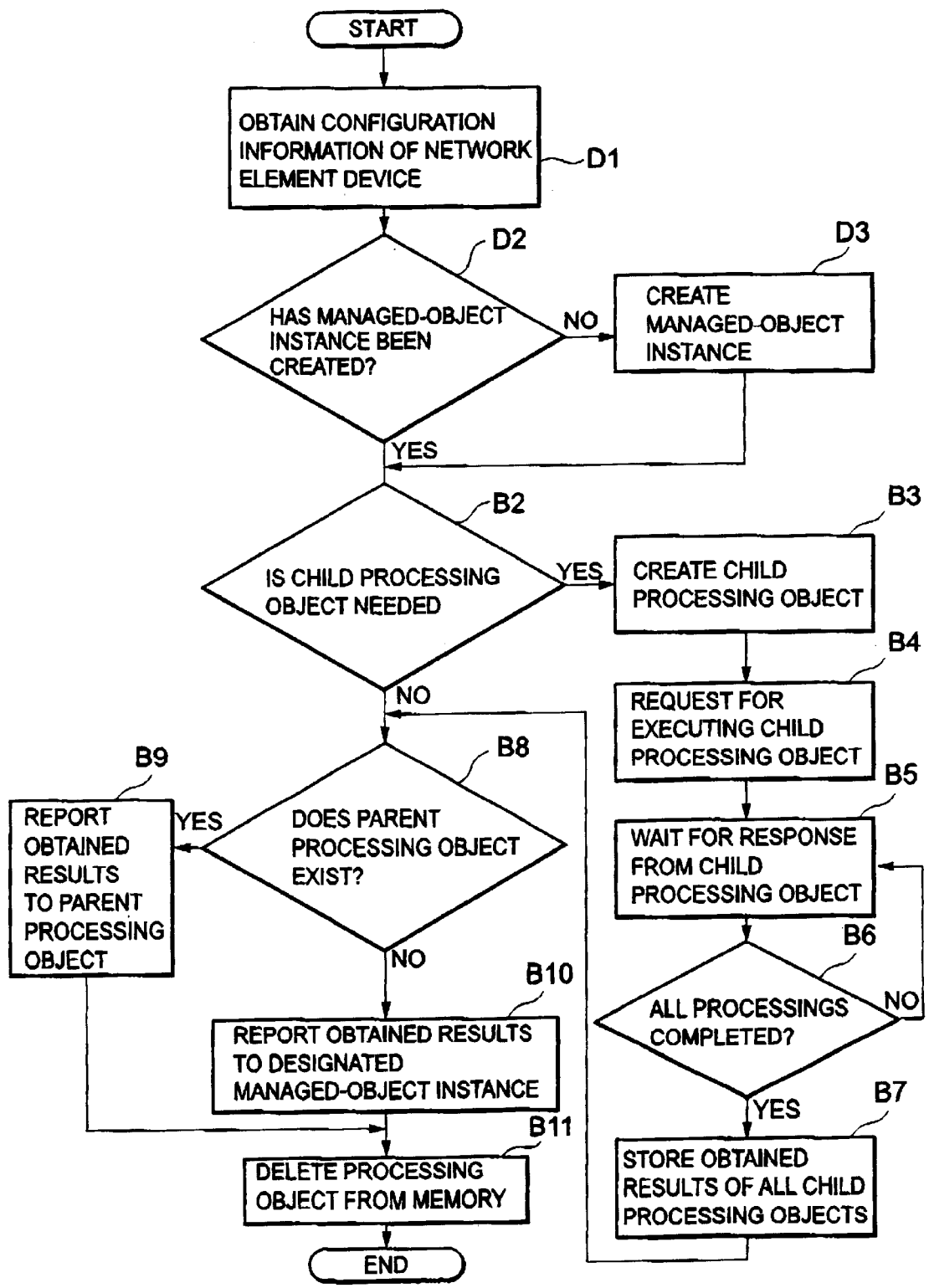
FIG. 8 is a flowchart showing an operation of a processing object in the second embodiment.

Referring to FIG. 8, the details of the step A5 will be described hereafter. Since the steps B2 through B11 are similar to those in FIG. 4, the descriptions are simplified.

When receiving the obtained configuration information of the network element device 5 from the device information access controller 24 (step D1), the processing object 32 determines whether the corresponding managed-object instance has been already created in the memory 3 (step D2). If the corresponding managed-object instance has never been created (NO in step D2), the managed-object instance is created (step D3).

Subsequently, the processing object 32 requires creation of child processing objects of the processing-object controller 22. Then the processing object 32 requires the access processing of the child processing objects to obtain the configuration information of the corresponding components of the network element device 5. Thereafter, the processing object 32 waits for the execution results to be received from all the child processing objects (steps B2–B6).

When the step B7 has been completed, it is determined whether a parent processing object exists by checking the pointer to parent processing object stored in the processing-object data memory section 321 (step B8). If a parent processing object exists (YES in step B8), the obtained results are transferred from the processing-object data memory section 321 to the parent processing object (step B9). If no parent processing object exists (NO in step B8), the obtained results are transferred from the processing-object data memory section 321 to the designated managed-object instance (step B10). Finally, after the step B9 or the step B10 has been completed, the processing object 32 is deleted from the memory 3 (step B11).

An example of a network management procedure according to the second embodiment will be described referring to FIGS. 9 and 10.

Figure 9:
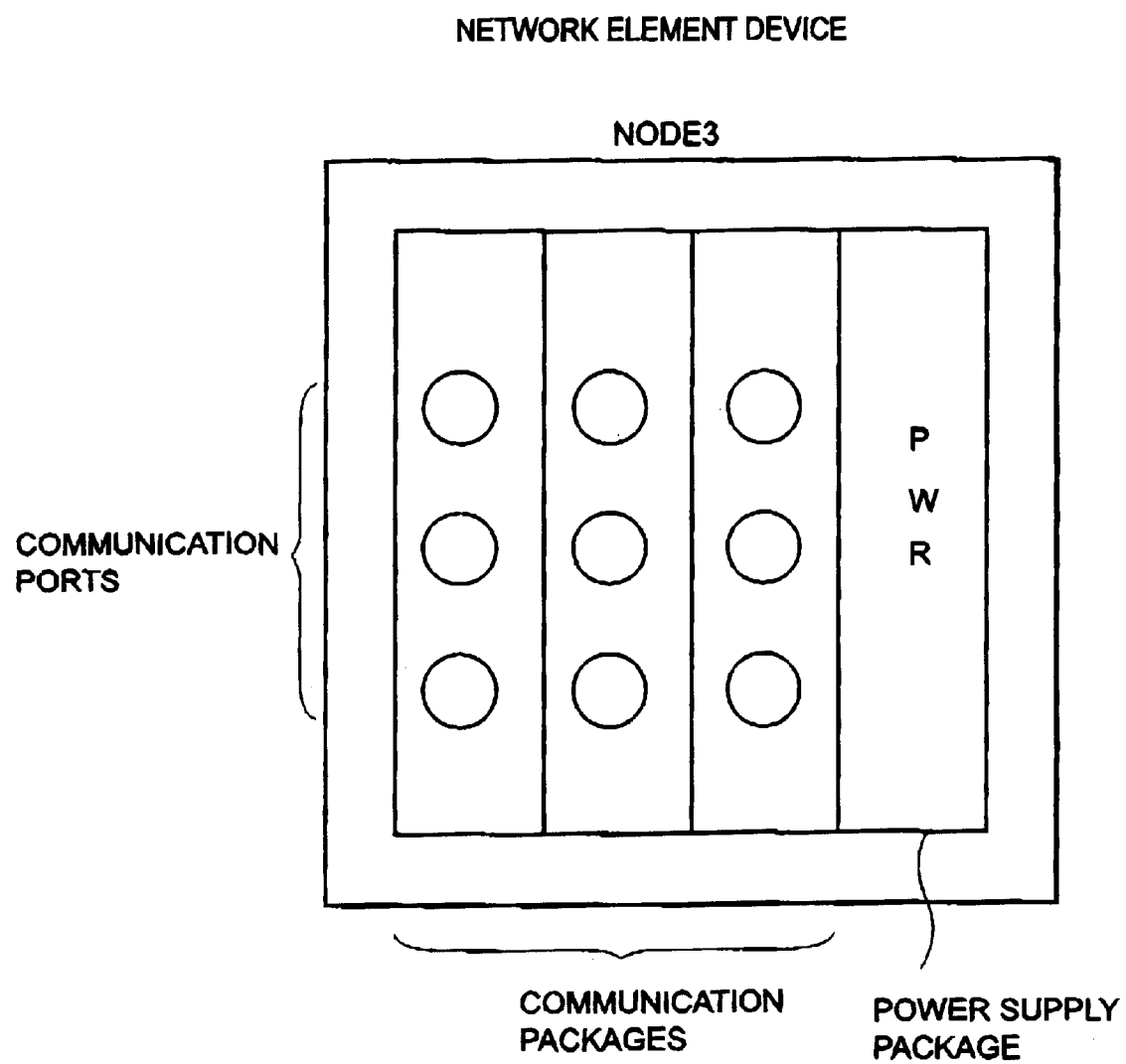
FIG. 9 is a diagram showing an example of a network element device to be added to the network in the second embodiment.

Referring to FIG. 9, it is assumed that a network element device node3 is composed of a power supply package and communication packages each having three communication ports.

When the network element device node3 is attached to the network, the device detector 23 detects the network element device node3 and informs the managed-object access processor 21 of the addition of the network element device node3 (step C1).

Figure 10:
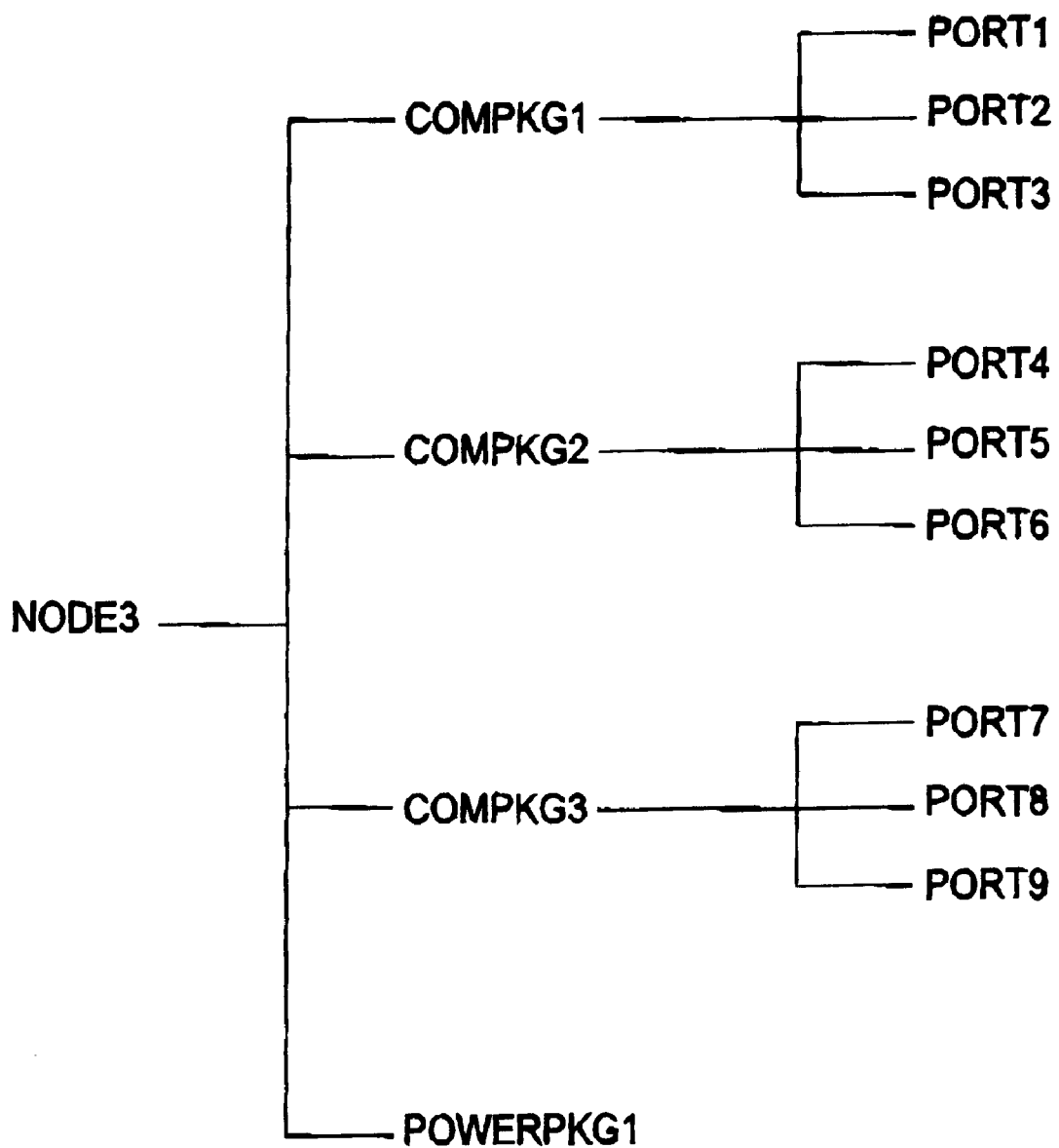
FIG. 10 is a diagram showing an example of a tree structure of the managed-object instances for explanation of the operation of the second embodiment.

When knowing the addition of the network element device node3, the managed-object access processor 21 creates a managed-object instance node3 in the memory 3 as shown in FIG. 10 (step C2). To create managed-object instances corresponding to the packages and the ports, the managed-object instance node3 requires creation of a processing object 32 for the managed-object instance node3 itself of the processing-object controller 22 (step A4).

The processing object 32 for the managed-object instance node3 obtains the configuration information of the network element device node3 from the device information access controller 24 (step D1). Thereafter, the processing object 32 determines whether the corresponding managed-object instance has been already created in the memory 3 (step D2).

Since the corresponding managed-object instance has been created (YES in step D2), the processing object 32 requires creation of child processing objects of the processing-object controller 22 (steps D2, B2, B3). In this case, the respective child processing objects correspond to managed-object instances compkg1 to compkg3 (communication packages 1–3) and powerpkg (power supply package) which are included in the node3.

The respective processing objects for compkg1–compkg3 requires the configuration information of the communication package and the communication ports included therein from the device information access controller 24 (step D1). Since the respective corresponding managed-object instances compkg1 to compkg3 have never been created (NO in step D2), these managed-object instances are created based on the obtained configuration information of the communication package and the communication ports (step D3).

Subsequently, the respective child processing objects corresponding to the ports are created (step B3). The access processing of the child processing objects are required to obtain the configuration information of the corresponding components (step B4).

Thereafter, the processing object 32 waits for the execution results to be received from all the child processing objects for the ports (steps B5 and B6). When the execution results have received from the child processing objects for the ports, the obtained execution results are sent back to the parent processing object (step B9).

Similarly, the processing object for powerpkg requires the configuration information of its own from the device information access controller 24 (step D1). After the managed-object instance is created based on the obtained configuration information (step D3), the execution results are sent back to the parent processing object (steps B2, B8 and B9). Finally, after the step B9 has been completed, the processing objects for compkg1-compkg3 and powerpkg are deleted from the memory 3 (step B11).

The processing object 32 for node3 which has received the execution results from the child processing objects for compkg1-compkg3 and powerpkg reports the execution results of the child processing objects to the managed-object instance node3 (step B10) and then is deleted from the memory 3 (step B11).

The managed-object instance node3 stores the result information received from the processing object 32 (step A6). Finally, the managed-object access processor 21 reports the addition of the network element device 5 to the network manager 1 (step A7).

n above-described manner, when a new network element device is added to the network, a processing object for the network element device obtains the configuration information of the network element device to automatically create a managed-object instance based on the obtained configuration information. Therefore, the management operation can be started without the network manager creating the managed-object instances of the components of the network element device.

As described above, according to the present invention, a processing object is recursively created to collect necessary information by distributed data processing and the collected information is sent back to the network manager. Therefore, the number of communication transactions between the network manager and the network management system is dramatically reduced, resulting in the improved performance of the network.

Further, according to the present invention, when a new network element device is connected to the network, a processing object for the network element device obtains the configuration information of the components of the network element device to automatically create a managed-object instance therefor. Therefore, an easy management operation can be achieved.

What is claimed is:

1. A method for managing a network composed of a plurality of managed objects using managed-object instances which are hierarchically organized in inclusion relation, the method comprising the steps of:
   a) receiving an access request to a designated managed-object instance from a manager, the designated managed-object instance corresponding to a certain managed object in the network;
   b) recursively creating a processing object for accessing a managed object included in the designated manage object based on the inclusion relation;
   c) recursively returning information obtained by a lower-level processing object to a higher-level processing object based on the inclusion relation; and
   d) returning a collection of information received by the designated managed-object instance to the manager.

2. The method according to claim 1, wherein the step (b) comprises the steps of:
   creating a processing object storing an identification of the processing object, a pointer to the designated managed-object instance, a pointer to a parent processing object, and a list of child processing objects; and
   creating a processing object corresponding to each child processing object included in the list of child processing objects if at least one child processing object is included in the list of child processing objects.

3. The method according to claim 2, wherein the step (c) comprises the steps of:
   collecting information from each child processing object; and
   returning a collection of information to a parent processing object thereof by referring to the pointer to the parent processing object.

4. A system for managing a network composed of a plurality of managed objects, comprising:
   a network manager;
   a memory storing a plurality of managed-object instances which are hierarchically organized in inclusion relation, each managed-object instance corresponding to a different managed object; and
   a processor for searching the memory for a managed-object instance designated by an access request received from the network manger, for recursively creating a processing object for accessing a managed object included in the designated manage object based on the inclusion relation and recursively returning information obtained by a lower-level processing object to a higher-level processing object based on the inclusion relation, and for returning a collection of information received by the designated managed-object instance to the network manager.

5. The system according to claim 4, wherein the processor creates a processing object storing an identification of the processing object, a pointer to the managed-object instance, a pointer to a parent processing object, and a list of child processing objects, and creates a processing object corresponding to each child processing object included in the list of child processing objects if at least one child processing object is included in the list of child processing objects.

6. The system according to claim 5, wherein the processor collects information from each child processing object, and returns a collection of information to a parent processing object thereof by referring to the pointer to the parent processing object.

* * * * *